US012146855B2

(12) United States Patent
Kondoh et al.

(10) Patent No.: US 12,146,855 B2
(45) Date of Patent: Nov. 19, 2024

(54) INTERNAL STATE DETECTOR AND VEHICLE

(71) Applicants: YAMAHA HATSUDOKI KABUSHIKI KAISHA, Iwata (JP); The University of Tokyo, Tokyo (JP)

(72) Inventors: Taku Kondoh, Shizuoka (JP); Akihiro Chiba, Shizuoka (JP); Shota Tezuka, Shizuoka (JP); Yoji Okabe, Tokyo (JP); Osamu Saito, Tokyo (JP); Peiwen Deng, Tokyo (JP)

(73) Assignees: YAMAHA HATSUDOKI KABUSHIKI KAISHA, Iwata (JP); THE UNIVERSITY OF TOKYO, Tokyo (JP)

(*) Notice: Subject to any disclaimer, the term of this patent is extended or adjusted under 35 U.S.C. 154(b) by 604 days.

(21) Appl. No.: 17/377,306

(22) Filed: Jul. 15, 2021

(65) Prior Publication Data
US 2021/0341426 A1 Nov. 4, 2021

Related U.S. Application Data

(63) Continuation-in-part of application No. PCT/JP2020/000332, filed on Jan. 8, 2020.

(30) Foreign Application Priority Data

Jan. 15, 2019 (JP) ................. 2019-004768

(51) Int. Cl.
G01N 29/04 (2006.01)
G01N 29/07 (2006.01)
(Continued)

(52) U.S. Cl.
CPC ........... *G01N 29/041* (2013.01); *G01N 29/07* (2013.01); *G01N 29/2437* (2013.01);
(Continued)

(58) Field of Classification Search
CPC .. G01N 29/041; G01N 29/07; G01N 29/2437; G01N 29/348; G01N 29/4427;
(Continued)

(56) References Cited

U.S. PATENT DOCUMENTS 8,499,632 B1 8/2013 Ihn et al.
2011/0191035 A1 8/2011 Volker et al.
(Continued)

FOREIGN PATENT DOCUMENTS

CN 102192954 A 9/2011
CN 107917957 A 4/2018
(Continued)

OTHER PUBLICATIONS

Deng Peiwen, "Simulation Methods of Guided Wave Propagation to Detect Impact Damages in CFRP Structures", 2018 Doctoral Dissertation Preliminary Examination Summary, University of Tokyo.
(Continued)

*Primary Examiner* — John E Breene
*Assistant Examiner* — Rose M Miller
(74) *Attorney, Agent, or Firm* — Rabin & Berdo, P.C.

(57) ABSTRACT

A detector that detects an internal state of a plate-shaped object including a fiber-reinforced resin. The detector includes an exciter that applies, to a surface of the object, ultrasonic vibrations of Lamb waves, in a selected frequency range where only a zero-order fundamental wave symmetric mode and a zero-order fundamental wave asymmetric mode of the Lamb waves appear, a vibration detector that detects the applied ultrasonic vibrations propagating in the object, and an internal state estimation calculator that estimates the internal state of the object, by obtaining a propagation time of the ultrasonic vibrations propagating in the object corresponding to each frequency of the Lamb waves, based on the detection result of the vibration detector, estimating the
(Continued)

internal state based on a delay time of the propagation time relative to a reference propagation time of the object for each frequency in the selected frequency range, and outputting the estimated internal state.

7 Claims, 10 Drawing Sheets

(51) Int. Cl.
    *G01N 29/24*     (2006.01)
    *G01N 29/34*     (2006.01)
    *G01N 29/44*     (2006.01)

(52) U.S. Cl.
    CPC ....... *G01N 29/348* (2013.01); *G01N 29/4427* (2013.01); *G01N 2291/011* (2013.01); *G01N 2291/0231* (2013.01); *G01N 2291/0258* (2013.01); *G01N 2291/0289* (2013.01); *G01N 2291/0423* (2013.01); *G01N 2291/0427* (2013.01); *G01N 2291/103* (2013.01)

(58) Field of Classification Search
    CPC ..... G01N 2291/011; G01N 2291/0231; G01N 2291/0258; G01N 2291/0289; G01N 2291/0423; G01N 2291/0427; G01N 2291/103
    USPC .......................................................... 73/598
    See application file for complete search history.

(56) References Cited

U.S. PATENT DOCUMENTS

| | | |
|---|---|---|
| 2011/0231112 A1 | 9/2011 | Soejima et al. |
| 2014/0330528 A1 | 11/2014 | Soejima et al. |
| 2015/0040671 A1 | 2/2015 | Malladi et al. |
| 2019/0283832 A1 | 9/2019 | Ueno et al. |

FOREIGN PATENT DOCUMENTS

| | | | | |
|---|---|---|---|---|
| CN | 115992691 A | * | 4/2023 | |
| JP | 2004117035 A | * | 4/2004 | ............ G01N 29/07 |
| JP | 2004177266 A | | 6/2004 | |
| JP | 2004301580 A | | 10/2004 | |
| JP | 2006343154 A | | 12/2006 | |
| JP | 2011191230 A | | 9/2011 | |
| JP | 2011529182 A | | 12/2011 | |
| JP | 5629481 B2 | | 11/2014 | |
| JP | 2018205185 A | | 12/2018 | |
| KR | 20120062423 A | * | 6/2012 | ............ G01N 21/88 |
| TW | 201639736 A | | 11/2016 | |
| TW | 201823085 A | | 7/2018 | |
| WO | 2018101374 A1 | | 6/2018 | |

OTHER PUBLICATIONS

Jennifer Michaels et al., "Chirp excitation of ultrasonic guided waves", Ultrasonics 53 (2013) 265-270. Available online Jul. 3, 2012.

Yeum Chul Min et al.: "Delamination detection in a composite plate using a dual piezoelectric transducer network", Health Monitoring of Structural and Biological Systems 2011, SPIE, 1000 20TH St. Bellingham WA 98225-6705 USA, vol. 7984, No. I, Mar. 24, 2011, pp. 798406/1-13, XP060011098.

Yoji Okabe et al., "Debonding Detection in CFRP Bonded Structures Using a Built-In Broadband Lamb Wave Propagation System", Nihon Kikai Gakkai Ronbunshu, A Hen/Transactions of the Japan Society of Mechanical Engineers, Part A vol. 76, No. 764 (2010), pp. 465-472.

Yoji Okabe et al., "Broadband Ultrasonic Propagation System for Damage Detection in Composite Laminates", Seisankenkyu, vol. 60, No. 4 (2008), pp. 385-388.

* cited by examiner

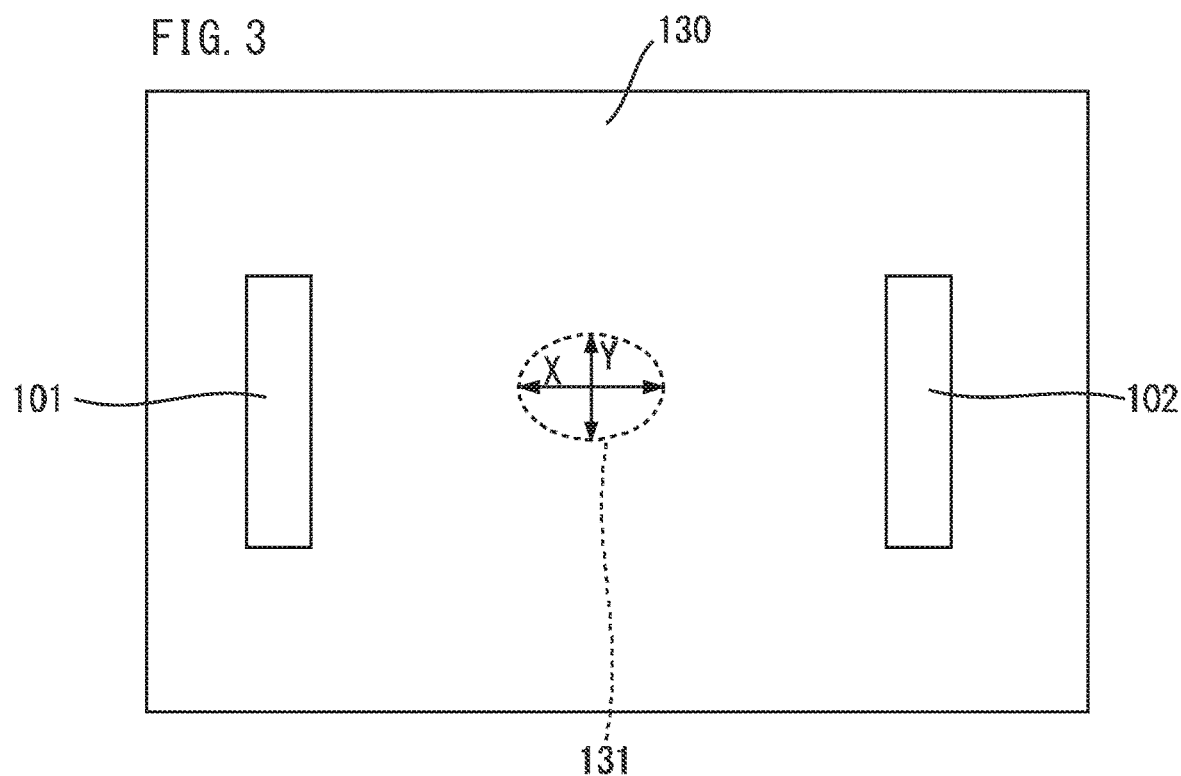
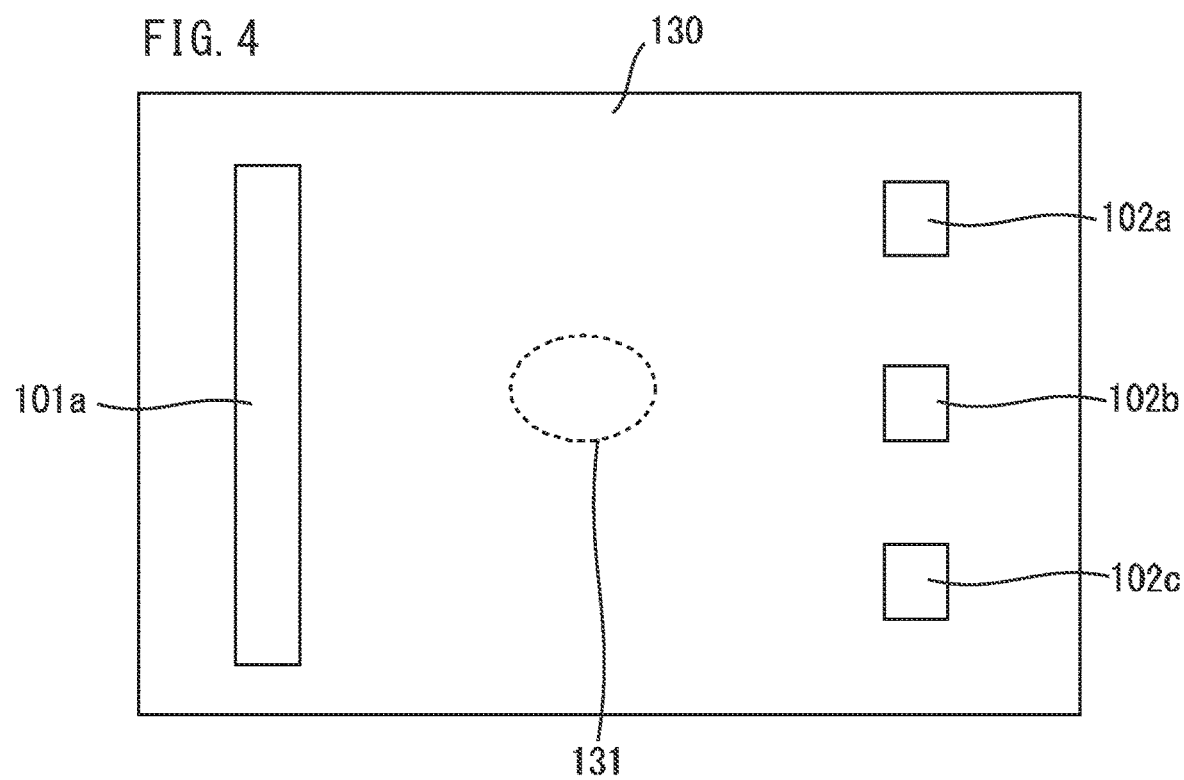

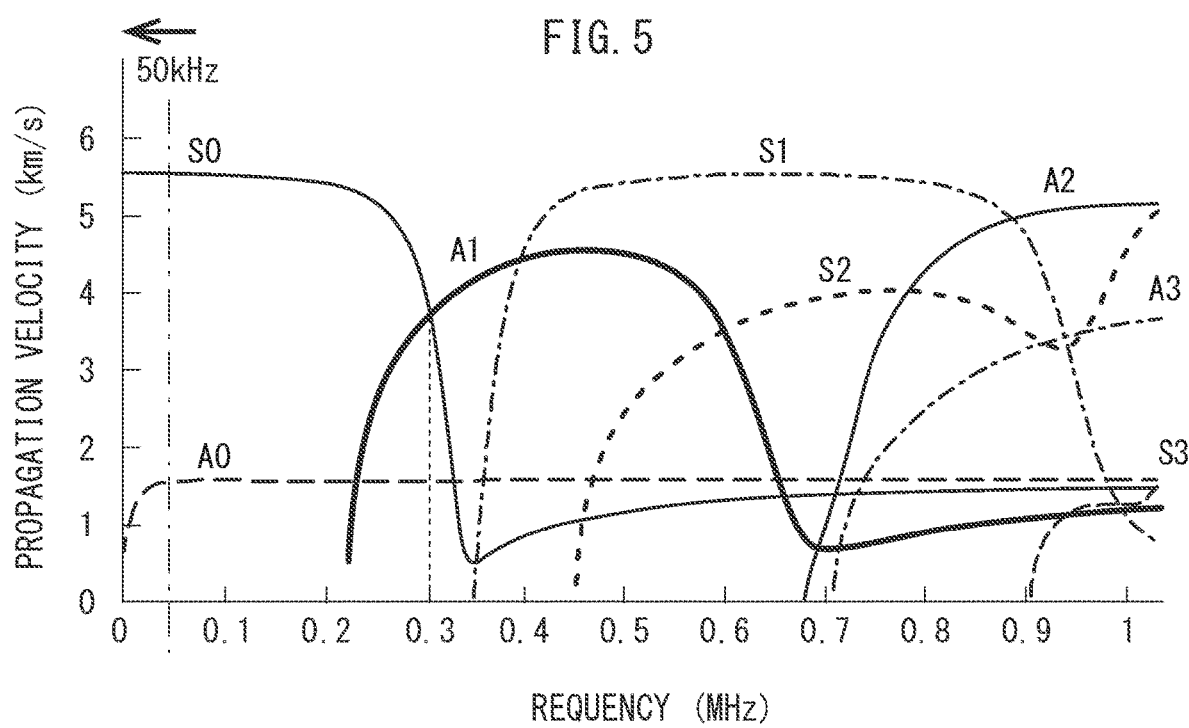

INTERNAL STATE DETECTOR AND VEHICLE

CROSS REFERENCE TO RELATED APPLICATIONS

This is a continuation-in-part application of international application PCT/JP2020/000332, filed on Jan. 8, 2020, which claims priority from a Japanese patent application no. 2019-004768, filed on Jan. 15, 2019, the contents of which are incorporated herein by reference.

TECHNICAL FIELD

The present teaching relates to an internal state detector and a vehicle.

BACKGROUND ART

An internal state of a carbon fiber-reinforced resin easily changes when an impact is applied to the carbon fiber-reinforced resin. Therefore, studies on technologies for detecting an internal state of a carbon fiber-reinforced resin have been promoted.

As a method for detecting an internal state of a carbon fiber-reinforced resin, a method in which an internal state of a carbon fiber-reinforced resin is detected based on a change of a waveform of ultrasonic waves in a propagation form called Lamb waves has been examined. The Lamb waves are ultrasonic waves that propagate in a plate member and have a relatively low attenuation. Accordingly, the Lamb waves can propagate in the plate member for a long distance. Therefore, the Lamb waves are suitable for detecting a change in an internal state, such as delamination occurring in the plate member including a carbon fiber-reinforced resin.

The Lamb waves have two characteristics, that is, a multiplex mode characteristic and a velocity dispersion characteristic (frequency dependency). Therefore, the Lamb waves have a plurality of modes in which a propagation velocity varies depending on a thickness of the plate member through which the Lamb waves propagate and depending on a frequency of the Lamb waves.

An example of a damage diagnosis system using the Lamb waves is disclosed in Patent Document 1. The damage diagnosis system disclosed in Patent Document 1 diagnoses damage by detecting whether there is delamination in a carbon fiber-reinforced resin laminated-plate. When delamination occurs, a propagation mode changes in a delamination portion. Therefore, the damage diagnosis system determines whether there is a change of the propagation mode, based on a propagation time, to diagnosis damage of the carbon fiber-reinforced resin laminated-plate. The following is described in Patent Document 1.

Lamb waves include waves in symmetric modes (symmetric modes: S modes) in which the waves have a symmetric displacement relative to a thickness center of a plate-shaped vibration propagation medium and waves in asymmetric modes (asymmetric modes: A modes) in which the waves have an asymmetric displacement. For each of Lamb waves in a fundamental wave symmetric mode (S0) and Lamb waves in a fundamental wave asymmetric mode (A0), there is a high-order n-order mode (Sn, An). It was found that Lamb waves in an S1 mode are converted into Lamb waves in an S0 mode and Lamb waves in an A1 mode in the delamination portion and thus propagate in the vibration propagation medium and, after passing through the delamination portion, the Lamb waves are restored to the Lamb waves in the S1 mode.

It was also found that, in the delamination portion, the Lamb waves in the A1 mode are changed to the Lamb waves in the S0 mode having a higher propagation velocity than that of the Lamb waves in the A1 mode and thus propagate and, after passing through the delamination portion, the Lamb waves are restored to the Lamb waves in the A1 mode and thus propagate. That is, a velocity change in the delamination portion is a change in arrival time, and an arrival time of Lamb waves in each mode uniquely changes depending on a length of the delamination portion in a vibration propagation direction.

The damage diagnosis system disclosed in Patent Document 1 can diagnose presence or absence of damage or a scale of damage by obtaining propagation intensity distribution data indicating a relationship between a frequency and a propagation time and also obtaining, in Lamb waves in a specific mode, a predetermined feature value (an index of damage scale) revealing a change of the arrival time of the Lamb waves in the specific mode, that is, for example, the Lamb waves in the A1 mode, due to an influence of damage from the propagation intensity distribution data.

CITATION LIST

Patent Document

Patent Document 1: Japanese Patent No. 5629481

SUMMARY OF INVENTION

Problems to be Solved by Invention

As described above, when delamination occurs in the carbon fiber-reinforced resin laminated-plate, the propagation mode of the Lamb waves changes in the delamination portion (this change will be hereinafter referred to as "propagation mode conversion") and the Lamb waves propagate in a different propagation mode from that in a portion (which will be herein after referred to as a "healthy portion") in which delamination has not occurred. Therefore, the arrival time of the Lamb waves varies in accordance with a difference between a propagation velocity of the Lamb waves in the mode of propagation in the healthy portion and a propagation velocity of the Lamb waves in the mode of propagation in the delamination portion and in accordance with a length of delamination. The damage diagnosis system of Patent Document 1 described above diagnoses presence or absence of delamination or a scale of delamination in the carbon fiber-reinforced resin laminated-plate using the difference in the propagation velocity as an index. For example, the propagation mode of the Lamb waves is converted from the Lamb waves in the A1 mode to the Lamb waves in the S0 mode in which the propagation velocity is higher than that of the Lamb waves in the A1 mode. The propagation mode of the Lamb waves is restored to the A1 mode in the healthy portion. As a result, when delamination occurs in the carbon fiber-reinforced resin laminated-plate, the propagation velocity of the Lamb waves is higher as compared to a case where there is only the healthy portion. Thus, the damage diagnosis system diagnoses the presence or absence of delamination or the scale of delamination in the carbon fiber-reinforced resin laminated-plate using the propagation time of the Lamb waves in the A1 mode.

In a so-called woven fiber-reinforced resin material obtained by impregnating a woven reinforced fiber with a resin, when the woven fiber-reinforced resin material receives an impact, fiber fracture, a shear crack, or delamination occurs in a dispersed manner. Therefore, in the woven fiber-reinforced resin material, the propagation mode of the Lamb waves is less likely to occur. Accordingly, it is difficult to detect an internal state of the woven fiber-reinforced resin material, based on a change of the propagation time of the Lamb waves due to a change of the propagation mode as in the damage diagnosis system described in Patent Document 1. That is, in the damage diagnosis system of Patent Document 1, it is difficult to detect a complex change of an internal state of the woven fiber-reinforced resin material including fiber fracture or a shear crack.

As described above, in the fiber-reinforced resin material including the woven fiber-reinforced resin material, when the fiber-reinforced resin material receives an impact, in addition to delamination, a shear crack or the like occurs as well. Therefore, it is desired that a damage diagnosis system that perform a damage diagnosis of the fiber-reinforced resin material including the woven fiber-reinforced resin material can not only detect presence or absence of delamination or a scale of delamination in the fiber-reinforced resin material but also can detect a complex change of an internal state.

It is therefore an object of the present teaching to provide an internal state detector capable of detecting a complex change of an internal state of a fiber-reinforced resin material including fiber fracture or a shear crack using ultrasonic vibrations.

Solution to Problem

Through an intensive study, the inventors of the present teaching have reached the following configuration.

An internal state detector according to one embodiment of the present teaching is an internal state detector that detects an internal state of a plate-shaped object by using ultrasonic vibrations of Lamb waves, the Lamb waves having, as modes of propagation to the object, a plurality of symmetric modes and a plurality of asymmetric modes in which a propagation velocity varies depending on a frequency, and the internal state detector includes an exciter that applies, to a surface of the plate-shaped object including a fiber-reinforced resin, ultrasonic vibrations of the Lamb waves including ultrasonic vibrations in a frequency range where only a fundamental wave symmetric mode (which will be hereinafter referred to as an S0 mode) and a fundamental wave asymmetric mode (which will be hereinafter referred to as an A0 mode) appear with respect to the object, a vibration detector that detects ultrasonic vibrations of the Lamb waves including the ultrasonic vibrations in the frequency range where only the S0 mode and the A0 mode appear, the ultrasonic vibrations being applied by the exciter to the object and propagating in the object, and an internal state estimation calculator that estimates an internal state of the object, based on a detection result of the vibration detector, and the internal state estimation calculator obtains a propagation time of ultrasonic vibrations propagating in the object corresponding to a frequency, based on an output value of the vibration detector obtained in vibration application by the exciter, estimates an internal state of the object, based on a delay time of the propagation time relative to a reference propagation time of the object in the frequency range where only the S0 mode and the A0 mode appear, and outputs the estimated internal state.

In the frequency range where only the S0 mode and the A0 mode appear, a change of the propagation time in at least one of the modes of ultrasonic vibrations of the Lamb waves can be easily grasped. In a case where fiber fracture, a shear crack, the like has occurred in the object and the internal state of the object has changed, an elastic modulus of the object reduces in a portion in which the internal state has changed. When the elastic modulus of the object reduces, in the frequency range where only the S0 mode and the A0 mode appear, the delay time of the propagation time of the ultrasonic vibrations can be easily grasped. Therefore, the internal state detector can estimate the internal state of the object including whether fiber fracture, a shear crack, or the like has occurred in the object by detecting the delay time of the propagation time relative to the reference propagation time.

In another aspect, the internal state detector according to the present teaching preferably includes the following configuration.

The internal state estimation calculator estimates an internal state of the object, based on a maximum time difference in delay times of the propagation time relative to the reference propagation time of the object for a plurality of frequencies in the frequency range where only the S0 mode and the A0 mode appear, and outputs the estimated internal state.

By using the maximum time difference in delay times of the propagation time relative to the reference propagation time of the object for a plurality of frequencies in the frequency range where only the S0 mode and the A0 mode appear, the internal state detector can easily grasp the delay time that is a delay in the propagation time relative to the reference propagation time of the object due to a change of the internal state. Thus, the internal state detector can easily estimate the internal state of the object.

In another aspect, the internal state detector according to the present teaching preferably includes the following configuration.

In the internal state detector, a plurality of vibration detectors are provided for one exciter, and the internal state estimation calculator obtains a propagation time of ultrasonic vibrations propagating in the object corresponding to a frequency from an output value of each of the plurality of vibration detectors, estimates an internal state of the object, based on a delay time of the propagation time relative to the reference propagation time of the object in the frequency range where only the S0 mode and the A0 mode appear, and outputs the estimated internal state.

The internal state detector includes the plurality of vibration detectors provided for one exciter, and thus, can estimates a change of the internal state in a wide range of the object. The internal state detector can also estimate a position in which the internal state has changed, based on each of the delay times of the propagation times relative to the reference propagation time.

In another aspect, the internal state detector according to the present teaching preferably includes the following configuration.

The internal state detector further includes a memory that stores reference propagation times of an object whose internal state is known corresponding to a plurality of frequencies in the frequency range where only the S0 mode and the A0 mode appear, and the internal state estimation calculator estimates an internal state of the object, based on a reference propagation time of the object corresponding to at least one frequency stored in the memory in the frequency range and based on the propagation time corresponding to a frequency equal to the at least one frequency, and outputs the estimated internal state.

The memory stores the reference propagation times of the object corresponding to the plurality of frequencies in the frequency range where only the S0 mode and the A0 mode appear. Therefore, the internal state estimation calculator can estimate the internal state of the object by comparing the reference propagation times of the frequencies stored in the memory with the propagation time of a frequency equal to the at least one frequency in the frequency range where only the S0 mode and the A0 mode appear.

In another aspect, the internal state detector according to the present teaching preferably includes the following configuration.

The exciter applies, to the object, ultrasonic vibrations whose frequency increases or decreases with time, as ultrasonic vibrations of the Lamb waves.

The ultrasonic vibrations whose frequency increases or decreases with time, that is, for example, chirp wave ultrasonic vibrations, can oscillate ultrasonic waves in a wide frequency range from 0 to 2 MHz. Thus, the internal state detector can efficiently acquire a relationship between a propagation time in which ultrasonic vibrations propagate in the object and a frequency of the ultrasonic vibrations.

In another aspect, the internal state detector according to the present teaching preferably includes the following configuration.

The exciter and the vibration detector are constituted by film-shaped piezoelectric elements.

For example, the film-shaped piezoelectric element, such as a film-shaped MFC element or the like, has flexibility and is difficult to break, and therefore, can be integrated with the object as one unit. The film-shaped piezoelectric element does not produce resonance points in the frequency range in which ultrasonic vibrations constituted by Lamb waves propagate in the object. Therefore, also in a case where chirp wave ultrasonic vibrations are used in detecting the internal state of the object, the internal state detector can accurately evaluate propagation of ultrasonic vibrations in a wide frequency range.

In another aspect, the internal state detector according to the present teaching preferably includes the following configuration.

The object is constituted by a woven fiber-reinforced resin material.

A vehicle according to one embodiment of the present teaching is a vehicle using a plate member including a fiber-reinforced resin for at least one component. The vehicle includes the internal state detector having any one of the configurations described above. The internal state detector estimates an internal state of the component as the object of the component.

According to the present teaching, in the vehicle using a plate member including a fiber-reinforced resin for at least one component, health monitoring can be performed.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In this specification, embodiments of an internal state detector and a vehicle according to the present teaching will be described.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Propagation Time]

As used herein, the term "propagation time" means a time until ultrasonic vibrations are detected by a vibration detector after the ultrasonic vibrations applied to an object by an exciter propagate in the object. A propagation time can be calculated from a relationship of a propagation velocity to a distance.

[Lamb Wave]

As used herein, the term "Lamb wave" means a wave that propagates in a plate member of an elastic body. A vibration direction of Lamb waves is perpendicular to a surface of a plate-shaped object.

[Vibration Direction]

As used herein, the term "vibration direction" means a direction of displacement that, when vibrations propagate in an object, occurs in the object due to the vibrations.

[Fundamental Wave Symmetric Mode]

As used herein, the term "fundamental wave symmetric mode (S0)" means a lowest-order mode among symmetric modes (S modes) in which waves have a symmetric displacement relative to a thickness center of a plate-shaped vibration propagation medium.

[Fundamental Wave Asymmetric Mode]

As used herein, the term "fundamental wave asymmetric mode (A0)" means a lowest-order mode among asymmetric modes (A modes) in which waves have an asymmetric displacement relative to a thickness center of a plate-shaped vibration propagation medium.

[Reference Propagation Time of Object]

As used herein, the term "reference propagation time of an object" means a time from application of ultrasonic vibrations to an object of a healthy portion by an exciter to detection of the ultrasonic vibrations that have propagated in the object by a vibration detector.

[Delay Time]

As used herein, the term "delay time" means a time of a delay of a propagation time in which ultrasonic vibrations propagate in an object relative to a reference propagation time of the object.

[Dispersion Curve]

As used herein, the term "dispersion curve" means a curve representing a propagation velocity in each mode as a function of a frequency for each mode of Lamb waves that occur in a plate member of an elastic body. The dispersion curve can be obtained using a stiffness matrix and a density of a material and a plate thickness of the material.

[UD material Including Carbon Fiber-Reinforced Resin]

As used herein, the term "uni-direction (UD) material including a carbon fiber-reinforced resin" is a carbon fiber-reinforced resin material formed by impregnating carbon fibers whose fiber directions are in one direction with a resin.

[Woven Fiber-Reinforced Resin Material]

As used herein, the term "woven fiber-reinforced resin material" means a fiber-reinforced resin material obtained by impregnating woven fibers with a resin.

[Vehicle]

As used herein, the term "vehicle" means a moving body that travels with at least a person riding thereon or an object loaded thereon. The vehicle is not limited to a moving body traveling on land and includes a moving body traveling in air and a moving body traveling on or in water. The vehicle includes, for example, a vehicle traveling on land, an aircraft or an airship traveling in air, a vessel traveling on water, a submarine traveling in water, or the like.

Advantageous Effects of Invention

One embodiment of the present teaching provides an internal state detector capable of detecting an internal state of a fiber-reinforced resin material using ultrasonic vibrations.

BRIEF DESCRIPTION OF DRAWINGS

FIG. 3 is a schematic plan view illustrating an exciter and a vibration detector arranged on an object in the internal state detector according to the embodiment.

FIG. 4 is a schematic plan view illustrating one exciter and a plurality of vibration detectors arranged on an object in the internal state detector according to the embodiment.

FIG. 5 is a characteristic diagram illustrating dispersion curves obtained when ultrasonic vibrations of Lamb waves are applied to an object.

DESCRIPTION OF EMBODIMENTS

Figure 1:
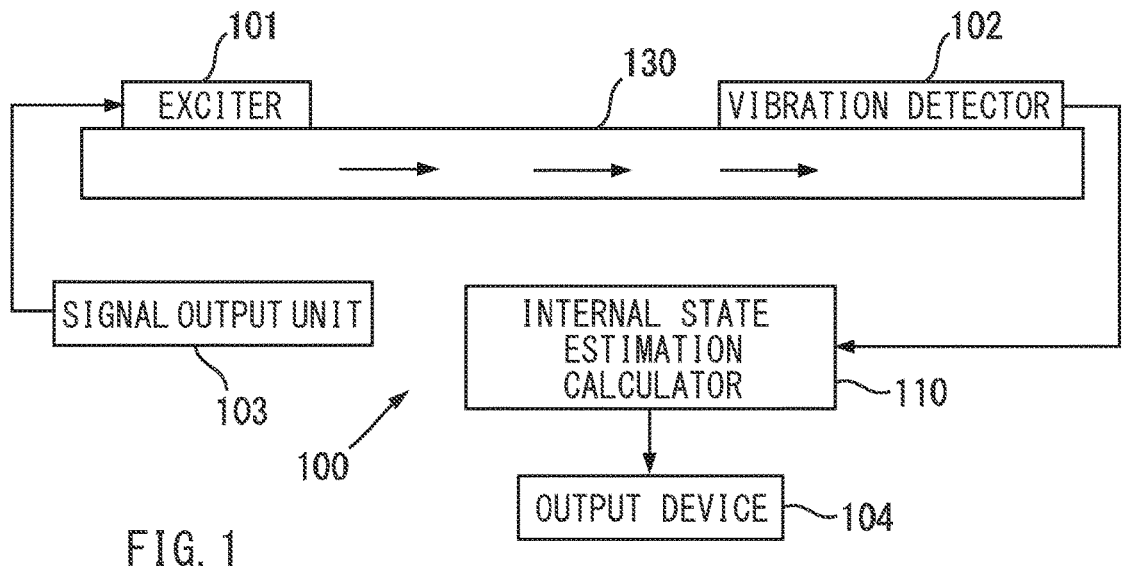
FIG. 1 is a block diagram illustrating a configuration of an internal state detector according to an embodiment of the present teaching.

Embodiments will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components, for example.

Figure 2:
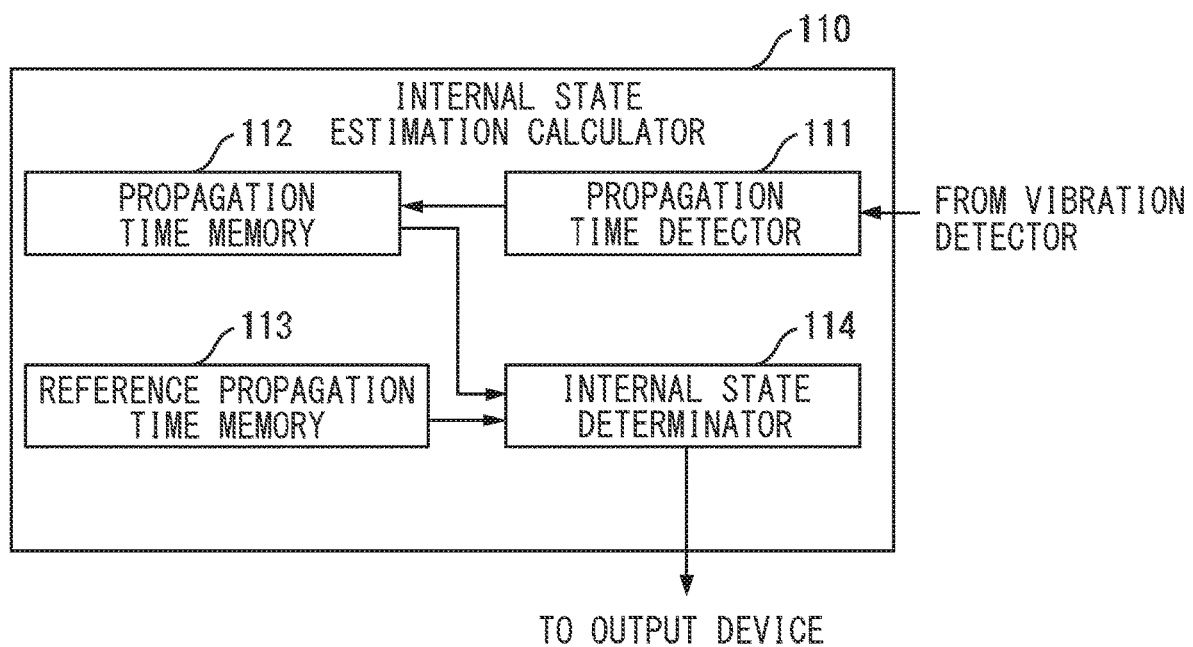
FIG. 2 is a block diagram illustrating a configuration of an internal state estimation calculator of the internal state detector according to the embodiment.

An internal state detector 100 according to this embodiment will be described below with reference to FIG. 1 and FIG. 2. FIG. 1 is a block diagram illustrating a configuration of an internal state detector according to this embodiment. FIG. 2 is a block diagram illustrating a configuration of an internal state estimation calculator according to this embodiment.

As illustrated in FIG. 1, the internal state detector 100 of this embodiment includes an exciter 101, a vibration detector 102, and an internal state estimation calculator 110. The exciter 101 and the vibration detector 102 are mounted on a surface of a plate-shaped object 130 constituted by a fiber-reinforced resin material. The internal state estimation calculator 110 estimates an internal state of a portion of the object 130 between the exciter 101 and the vibration detector 102.

The object 130 is constituted by a fiber-reinforced resin material obtained by reinforcing a resin with a fiber, such as a carbon fiber. In this embodiment, the carbon fiber is, for example, a woven fiber in which fibers are woven. That is, in this embodiment, the fiber-reinforced resin material is a woven fiber-reinforced resin material.

FIG. 3 is a plan view schematically illustrating the object 130 on which the exciter 101 and the vibration detector 102 are mounted. FIG. 3 schematically illustrates an internal state a change portion 131 located between the exciter 101 and the vibration detector 102 mounted on the object 130 and generated in the object 130 by at least one of fiber fracture, a shear crack, or delamination. As will be described later, when the internal state change portion 131 is generated in the object 130, a propagation time of ultrasonic vibrations that propagate in the object 130 is longer than a propagation time (reference propagation time) of ultrasonic vibrations in a case where a healthy woven fiber-reinforced resin material is the object. That is, in a case where ultrasonic vibrations propagate in the object 130 having the internal state change portion 131 therein, a delay time of the propagation time occurs. The internal state estimation calculator 110 detects an internal state of the object 130, based on the delay time.

In this embodiment, the exciter 101 applies, to a surface of the object 130, ultrasonic vibrations of Lamb waves including ultrasonic vibrations in a frequency range where only a fundamental wave symmetric mode (S0 mode) and a fundamental wave asymmetric mode (A0 mode) appear.

In this embodiment, as the ultrasonic vibrations of the Lamb waves, chirp wave ultrasonic vibrations are used. The chirp wave ultrasonic vibrations are ultrasonic vibrations whose frequency increases or reduces with time. The chirp wave ultrasonic vibrations are ultrasonic vibration in a wide frequency range, for example, from 0 to 2 MHz. By using the chirp wave ultrasonic vibrations as the ultrasonic vibrations of the Lamb waves, the internal state detector 100 can efficiently acquire a relationship between the propagation time in which the ultrasonic vibrations propagate in the object 130 and a frequency of the ultrasonic vibrations.

In this embodiment, the exciter 101 is constituted by a film-shaped piezoelectric element. As the film-shaped piezoelectric element, for example, a film-shaped micro fiber composite (MFC) with a vibration directivity can be used. The film-shaped MFC includes a plurality of extremely thin prismatic columns of piezoelectric ceramics adhered together with an epoxy resin in a state where the plurality of extremely thin prismatic columns of piezoelectric ceramics are arranged in one direction and thus integrated as one in a film shape. An electrode is bonded to each of upper and lower surfaces of the piezoelectric ceramics integrated as one in a film shape. By applying a pressure to the electrodes, a strain is generated in the film-shaped MFC. Therefore, the film-shaped MFC can be used as an ultrasonic oscillating element.

A signal output unit 103 outputs a chirp signal as a drive voltage to the exciter 101. The exciter 101 is driven in accordance with the input chirp signal to apply chirp wave ultrasonic vibrations to the object 130. The signal output unit 103 outputs the drive voltage to the exciter 101 so as to apply, to the object 130, chirp wave ultrasonic vibrations including ultrasonic vibrations in a frequency range where only the S0 mode and the A0 mode appear.

The above-described film-shaped piezoelectric element can output a voltage in accordance with a strain generated in the film-shaped piezoelectric element. Therefore, in this embodiment, the vibration detector 102 is also constituted by a film-shaped piezoelectric element. Similar to the exciter 101, as the film-shaped piezoelectric element of the vibration detector 102, for example, a film-shaped MFC with a vibration directivity can be used. A configuration of the film-shaped MFC is similar to that of the exciter 101, and therefore, detailed description of the film-shaped MFC will be omitted.

In the vibration detector 102, a strain is generated in the piezoelectric ceramics of the film-shaped MFC by ultrasonic vibrations that are applied to the object 130 by the exciter 101 and propagate in the object 130. The vibration detector 102 detects ultrasonic vibrations, based on a voltage generated in accordance with the strain generated in the piezoelectric ceramics. The vibration detector 102 detects the ultrasonic vibrations including ultrasonic vibrations in the frequency in which only the S0 mode and the A0 mode appear. The vibration detector 102 outputs a detection result to the internal state estimation calculator 110.

Note that the above-described film-shaped MFC has a thickness of about 0.3 mm. Thus, the film-shaped MFC is small in size and light in weight. The film-shaped MFC has flexibility and is difficult to break. Therefore, by mounting the film-shaped MFC on the object 130 constituted by the woven fiber-reinforced resin material, the object 130 can be integrated with the exciter 101 and the vibration detector 102 as one unit. As the film-shaped MFC, for example, an MFC manufactured by Smart Material Co., Ltd. may be used.

As illustrated in FIG. 3, the exciter 101 constituted by the film-shaped MFC and the vibration detector 102 constituted by the film-shaped MFC are mounted on the object 130 with an adhesive with a predetermined distance therebetween. Ultrasonic vibrations generated by the exciter 101 propagate in the object 130 and are received by the vibration detector 102. The exciter 101 and the vibration detector 102 are constituted by a flexible film-shaped MFC. Thus, the exciter 101 and the vibration detector 102 are deformable following deformation of the object 130. Therefore, functions of the exciter 101 and the vibration detector 102 are less likely to be impaired by deformation of the object 130.

The film-shaped MFC can oscillate ultrasonic waves without using resonance characteristics. Therefore, the film-shaped MFC does not have a resonant point in a frequency range where ultrasonic vibrations including Lamb waves propagate. That is, the exciter 101 constituted by the film-liked MFC generates ultrasonic vibrations in a frequency range where there is no resonant point. Thus, the exciter 101 can generate ultrasonic vibrations over a wide frequency range. Similarly, the vibration detector 102 constituted by a film-shaped MFC can receive ultrasonic vibrations over a wide frequency range. The internal state estimation calculator 110 can easily obtain information related to propagation of ultrasonic vibrations not only in a single frequency but also in a wide frequency range by using the exciter 101 and the vibration detector 102 each constituted by the film-shaped MFC.

Incidentally, as for chirp wave ultrasonic vibrations, when frequency responsiveness is not uniform due to an influence of a resonant point, propagation of the ultrasonic vibrations in a wide frequency range cannot be accurately evaluated in some cases. However, as described above, the film-shaped MFC does not have a resonant point in a frequency range where ultrasonic vibrations including Lamb waves propagate. Accordingly, chirp wave ultrasonic vibrations generated by the film-shaped MFC do not have a resonance point. Thus, the internal state estimation calculator 110 can accurately evaluate propagation of ultrasonic vibrations in a wide frequency range also by using chirp wave ultrasonic vibrations.

The film-shaped MFC can be easily increased in size. Therefore, the exciter 101 and the vibration detector 102 can be constituted by, for example, a film-shaped MFC that is long in one direction. Accordingly, the internal state detector 100 can detect the internal state of the object 130 in a wide region by the exciter 101 and the vibration detector 102.

The internal state estimation calculator 110 estimates the internal state of the object 130 from the detection result of the vibration detector 102. The internal state estimation calculator 110 calculates a propagation time that varies in accordance with a frequency of ultrasonic vibrations generated in the object 130 by the exciter 101 from an output value of the vibration detector 102 obtained when the exciter 101 applies vibrations.

When an impact is applied to the object 130, fiber fracture, a shear crack, or the like occurs in the object 130. That is, when the object 130 receives an impact, a complex change of the internal state of the object 130 occurs. A region in which a state change has occurred in the object 130 can be considered as a region in which an elastic modulus of the object 130 has been reduced.

When the elastic modulus of the object 130 reduces, the propagation time of the ultrasonic vibrations delays relative to a reference propagation time of the object 130.

The internal state estimation calculator 110 calculates the delay (delay time) of the propagation time relative to the reference propagation time of the object 130 in the frequency range where only the S0 mode and the A0 mode appear. Note that, in the frequency range where only the S0 mode and the A0 mode appear, the number of Lamb waves in the modes that appear is two, as will be described later. Therefore, the internal state estimation calculator 110 can easily detect the delay (delay time) of the propagation time relative to the reference propagation time of the object 130.

The delay time depends on a frequency of ultrasonic vibrations. That is, as the frequency reduces, a group velocity reduces, and the propagation time increases accordingly. In a case where the propagation time is long, when a change occurs at the same rate, a change amount thereof is large. Accordingly, the delay time is long. As used herein, the term "group velocity" means a velocity at which, when a plurality of waves are superimposed, the entire waves move.

The delay time also depends on a size of a change region of the internal state of the object 130.

When a wavelength of waves that propagate is shorter than a wavelength almost equivalent to a size of a fine change of the internal state, it cannot be considered that reduction in elastic modulus has occurred uniformly in the entire change region of the internal state. However, a wavelength of ultrasonic waves in a low frequency range that is the frequency range where only the S0 mode and the A0 mode appear is long. The wavelength of the ultrasonic wave in the low frequency range is longer than the size of the fine change of internal state, and therefore, a region in which the internal state has changed can be considered as a region in which the elastic modulus has reduced. The delay time increases as the region in which the internal state has changed increases in size. Therefore, the size of the region in which the internal state has changed can be quantitatively estimated from the delay time.

The internal state estimation calculator 110 estimates the internal state of the object 130, based on the calculated delay time. The internal state estimation calculator 110 outputs a result of the estimation to an output device 104.

The output device 104 is constituted by a lamp or the like. For example, in a case where the internal state estimation calculator 110 estimates that there is a region in which the internal state has changed in the object 130, the output device 104 notifies a user, such as a driver or the like, of a result of the estimation. The internal state detector 100 can notify the user of the internal state of the object 130 by causing the output device 104 to operate.

Next, a configuration of the internal state estimation calculator 110 will be described with reference to FIG. 2. The internal state estimation calculator 110 includes a propagation time detector 111, a propagation time memory 112, a reference propagation time memory 113, and an internal state determinator 114.

The propagation time detector 111 detects a propagation time for each frequency, based on the detection result from the vibration detector 102. The propagation time for each frequency is stored in the propagation time memory 112.

The reference propagation time memory 113 stores, as a reference propagation time of an object, a propagation time for each frequency of ultrasonic vibrations for a material which has the same size and the same configuration as those of the object 130 and whose entire portion is a healthy portion in advance.

The internal state determinator 114 compares the reference propagation time of ultrasonic waves in at least one frequency stored in the reference propagation time memory 113 with the propagation time of the ultrasonic waves in the at least one frequency stored in the propagation time memory 112 and calculates a delay time of the propagation time relative to the reference propagation time from a result of the comparison. The internal state determinator 114 determines the internal state of the object 130, based on the calculated delay time.

In this embodiment, the internal state determinator 114 determines the internal state of the object 130, based on a largest delay time among the delay times of ultrasonic waves in a plurality of frequencies in the frequency range where only the S0 mode and the A0 mode appear. Thus, the internal state determinator 114 can easily grasp a delay of the propagation time due to a change of the internal state of the object 130. Accordingly, the internal state determinator 114 can easily estimate the internal state of the object 130.

Note that, in a frequency in the frequency range where only the S0 mode and the A0 mode appear, the internal state determinator 114 can easily grasp a change of a propagation time of ultrasonic vibrations in Lamb waves in at least one mode. Accordingly, the internal state determinator 114 may be configured to estimate a change of the internal state of the object 130, based on the calculated delay time, without using the largest delay time as described above.

Furthermore, the internal state determinator 114 may be configured to calculate in advance a delay time for each of objects having regions with different sizes in which internal states thereof have changed and store the delay times in the reference propagation time memory 113. Thus, the internal state determinator 114 can also estimate a size of a region in which the internal state has changed, based on the delay time.

The internal state determinator 114 outputs a result of determination on the internal state of the object 130 to the output device 104. In a case where the internal state determinator 114 determines that the internal state of the object 130 has not changed, the internal state determinator 114 outputs, to the output device 104, a signal indicating that the internal state is normal. On the other hand, when the internal state determinator 114 determines from the calculated delay time that there is a region in which the internal state of the object 130 has changed, the internal state determinator 114 outputs, to the output device 104, a signal indicating that there is the region in which the internal state has changed.

Now, the frequency range where only the S0 mode and the A0 mode appear will be described with reference to FIG. 5. FIG. 5 is a characteristic diagram illustrating dispersion curves obtained when ultrasonic vibrations of Lamb waves are applied to an object. Modes when Lamb waves propagate in a plate-shaped vibration propagation medium include symmetric modes (S modes) in which waves have a symmetric displacement relative to a thickness center of the vibration propagation medium and asymmetric modes (A modes) in which waves have an asymmetric displacement. The modes include high-order n-order modes (Sn, An) for each of the fundamental wave symmetric mode (S0 mode) and the fundamental wave asymmetric mode (A0 mode).

The dispersion curves are curves each representing, for each mode of Lamb waves that propagate in a plate member of an elastic body, the propagation velocity of each mode as a function of a frequency. The dispersion curves can be obtained using a stiffness matrix and a density of a material and a plate thickness of the material.

FIG. 5 illustrates dispersion curves in a case where the object is a woven carbon fiber-reinforced resin material with a thickness of 3.7 mm. As illustrated in FIG. 5, in a low frequency range from 200 to 300 kHz, the propagation velocity of the Lamb waves in the A1 mode is lower than the propagation velocity of the Lamb waves in the S0 mode. On the other hand, in a higher frequency than 300 kHz, the propagation velocity of the Lamb waves in the A1 mode is higher than the propagation velocity of the Lamb waves in the S0 mode. That is, a magnitude relationship between the propagation velocity of the Lamb waves in the A1 mode and the propagation velocity of the Lamb waves in the S0 mode is reversed at 300 kHz. Note that the woven carbon fiber-reinforced resin material is formed by a prepreg manufactured by impregnating a woven carbon fiber with a resin. As the woven carbon fiber, Pyrofil™ of Mitsubishi Chemical Corporation was used.

In a lower frequency range than 200 kHz, the modes of the Lamb waves that propagate in the plate member of the elastic body are only the S0 mode and the A0 mode.

As illustrated in FIG. 5, also in a case of the Lamb waves in some other mode than the S0 mode and the A1 modes, when the frequency is high, the magnitude relationship between the propagation velocity in a symmetric mode and the propagation velocity in an asymmetric mode is reversed. For example, when the frequency is higher than 300 kHz, the propagation velocity of the Lamb waves in the S0 mode is reduced and becomes lower than the propagation velocity of the Lamb waves in the A0 mode between 300 kHz and 400 kHz. Similarly, for the propagation velocities in many symmetric modes and the propagation velocities in many asymmetric modes, the magnitude relationship is reversed when the frequency is high In this embodiment, at a frequency lower than 300 kHz that is a lowest frequency among frequencies at which the propagation velocity in the symmetric mode and the propagation velocity in the asymmetric mode are reversed, ultrasonic vibrations including ultrasonic vibrations in the frequency range where there are only the symmetric mode (S0 mode) and the asymmetric mode (A0 mode) whose propagations velocities are reversed at the lowest frequency are used for estimating the internal state of the object.

For the ultrasonic vibrations including ultrasonic vibrations in the frequency range up to 300 kHz that is the frequency at which the propagation velocity of the Lamb waves in the S0 mode and the propagation velocity of the Lamb waves in the A1 mode are reversed, as illustrated in FIG. 5, the modes of the Lamb waves that propagate in the plate member of the elastic body are the A0, S0, and A1 modes. Therefore, the internal state detector 100 can detect, in Lamb waves in limited modes among the modes of the Lamb waves that propagate in the plate member of the elastic body, a delay in the propagation time of the Lamb waves due to a change of the internal state of the object. That is, in this embodiment, the internal state detector 100 can easily detect the delay time using the propagation velocities in the frequency range where the modes of the Lambs waves are only the A0 mode and the S0 mode.

As illustrated in FIG. 5, in particular, in a low frequency range that is lower than 50 kHz, the internal state detector 100 can easily detect the delay time using the propagation velocities in the S0 mode and the A0 mode. That is, in the frequency range that is lower than 50 kHz, the propagation velocity in the S0 mode is constant and the propagation velocity in the A0 mode reduces as the frequency reduces. In the low frequency range that is lower than 50 kHz, the propagation velocity in the A0 mode is low. Thus, by detecting the propagation velocity in the A0 mode, the internal state detector 100 can easily obtain the delay time.

Based on the foregoing, in the frequency range where only the S0 mode and the A0 mode appear as modes of Lamb waves, the number of the modes of the Lamb waves is two. Therefore, the internal state detector 100 can easily detect a propagation velocity of ultrasonic vibrations in each mode. Specifically, in a frequency range that is lower than 50 kHz, the propagation velocity in the S0 mode is constant and the propagation velocity in the A0 mode is lower than the propagation velocity in the S0 mode. Therefore, by detecting the propagation velocity in each mode at a frequency lower than 50 kHz, the internal state detector 100 can easily obtain a delay time relative to the reference propagation time.

FIG. 5 illustrates dispersion curves in a case where the object is a woven carbon fiber-reinforced resin material with a thickness of 3.7 mm including a carbon fiber-reinforced resin material. Similar dispersion curves are obtained even when a plate thickness of the woven carbon fiber-reinforced resin material varies. As described above, even in a case where the object is constituted by a woven fiber-reinforced resin material, the internal state detector 100 can obtain the delay time using the propagation velocity in each mode of the lamb waves in a frequency lower than 50 kHz.

Note that the dispersion curves can be obtained using a stiffness matrix and a density of a material and a plate thickness of the material. Thus, even by using a UD material including a carbon fiber-reinforced resin, a similar result for the dispersion curves can be achieved.

Next, a result of application of an impact to an object by a falling weight test performed in order to check a change of the internal state according to the present teaching will be described. The falling weight test was performed on each of a UD material including a carbon fiber-reinforced resin material and a woven fiber-reinforced resin material.

The falling weight test on the UD material was performed using an object 130a of the UD material with a thickness of 3.4 mm including a carbon fiber-reinforced resin material. In the test, a weight 135 was dropped on a surface of the object 130a to apply an impact on the surface of the object 130a. A change of an internal state of the object 130a was checked by observing a cross section of the object 130a after the falling weight test. The falling weight test was performed by dropping the weight 135 on the surface of the object 130a such that an impact energy applied to the surface of the object 130a was 15.9 J. In this case, the UD material including the carbon fiber-reinforced resin material was formed using a prepreg for general industrial use manufactured by Toray Industries, Inc.

Figure 6:
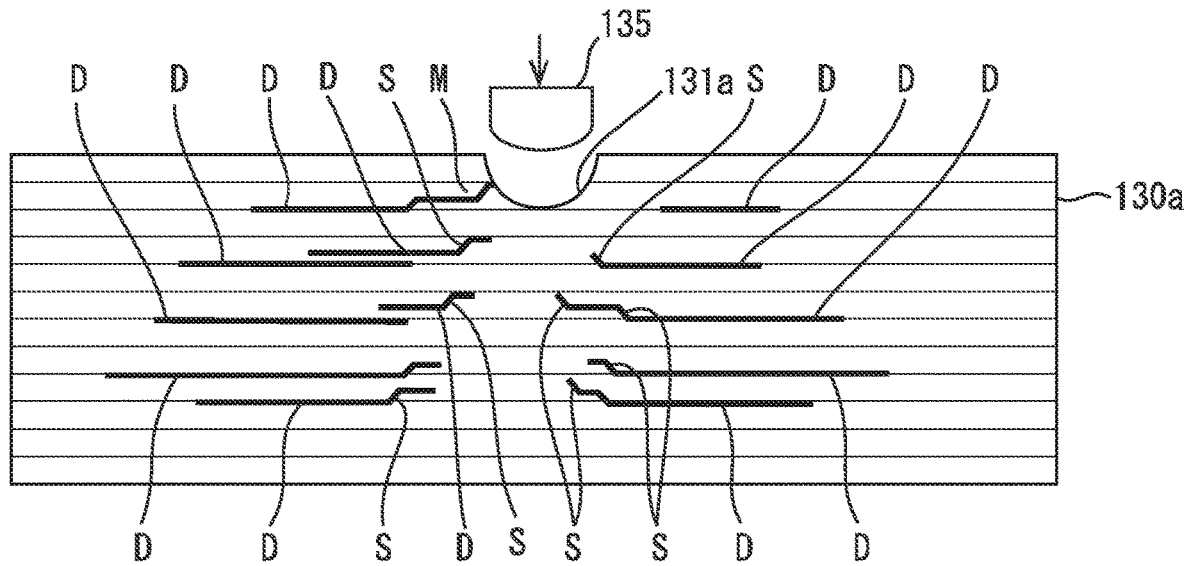
FIG. 6 is a schematic diagram illustrating a change of an internal state occurring when a falling weight impact is applied to a UD material including a carbon fiber-reinforced resin.

FIG. 6 is a schematic diagram illustrating a result of observation. As illustrated in FIG. 6, a dent 130a was generated in the surface of the object 130a. Delamination D and shear cracks S occurred in the object 130a. It is understood that, in the object 130a of the UD material including the carbon fiber-reinforced resin, a major change of the internal state was the delamination D.

Next, the falling weight test of the woven fiber-reinforced resin material was performed using an object 130b with a thickness of 3.7 mm including the woven fiber-reinforced resin material. In the falling weight test, the weight 135 was dropped on a surface of the object 130b to apply an impact on the surface of the object 130b, and then, a change of the internal state of the object 130b was checked by observing a cross section of the object 130b. The falling weight test was performed by dropping the weight 135 on the surface of the object 130b such that an impact energy applied to the surface of the object 130b was 15.9 J.

Figure 7:
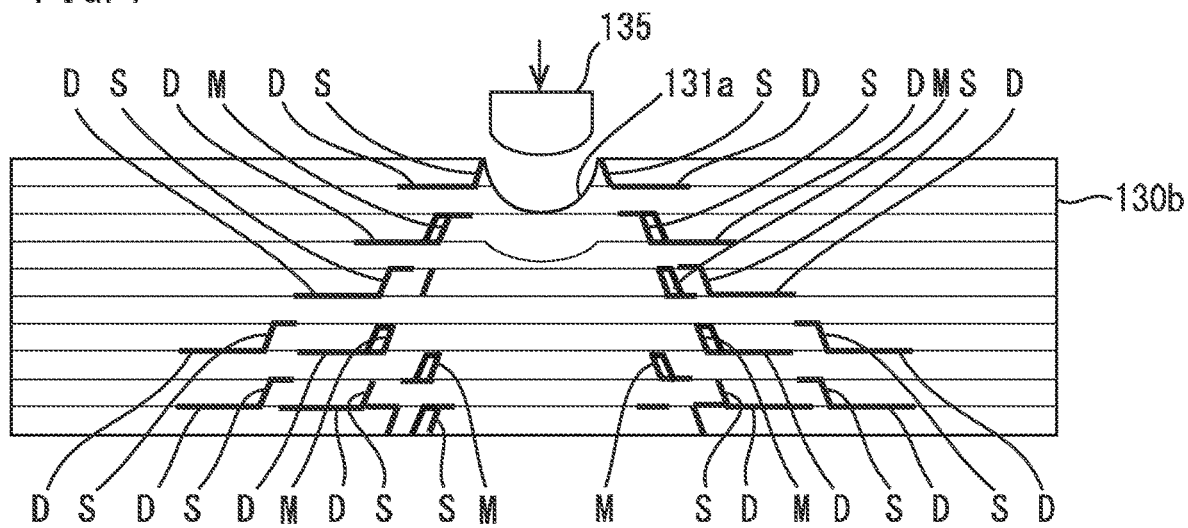
FIG. 7 is a schematic diagram illustrating a change of an internal state occurring when a falling weight impact is applied to a woven fiber-reinforced resin material.

FIG. 7 is a schematic diagram illustrating a result of observation. As illustrated in FIG. 7, a dent 131a was generated in the surface of the object 130b. A combined change M of the delamination D, the shear cracks S, fiber fracture, and the like in the internal state occurred in the object 130b. It is understood that, in the object 130b including the woven fiber-reinforced resin material, a complex change of the internal state occurred, as compared to the UD material including the carbon fiber-reinforced resin material.

Incidentally, when an internal state of an object changes, an elastic modulus of the object changes. The inventors of the present teaching focused on that a delay occurs in a propagation time of ultrasonic vibrations that propagate in the object accompanying such a change of the elastic modulus of the object. In this embodiment, an internal state of an object is detected using a delay of a propagation time.

Figure 8:
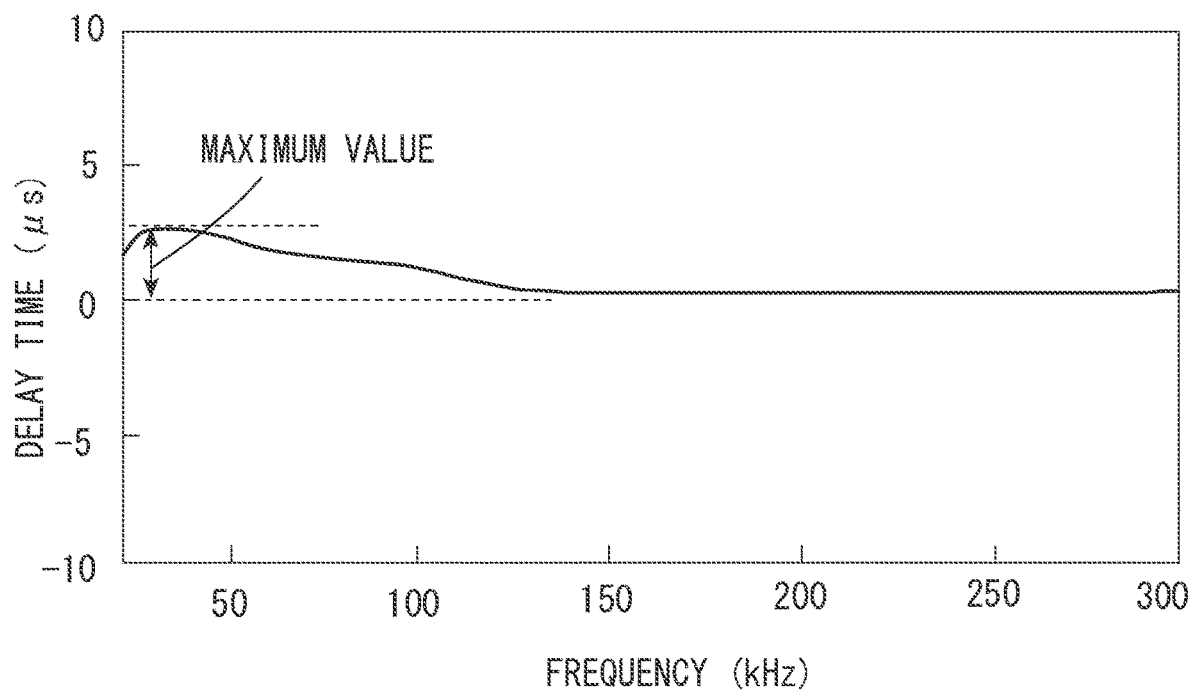
FIG. 8 is a characteristic diagram illustrating a relationship between a delay time of a propagation time of a woven fiber-reinforced resin material that is an object and a frequency.

FIG. 8 is a characteristic diagram obtained by measuring a relationship between a delay time occurring between a propagation time calculated using a woven fiber-reinforced resin as an object and a propagation time calculated using a healthy woven fiber-reinforced resin material serving as a reference as the object and a frequency.

As the object, the object 130b illustrated in FIG. 7 was used. The exciter 101 and the vibration detector 102 were mounted on the object 130b. A region in which the internal state changed was located between the exciter 101 and the vibration detector 102 in the object 130b. Note that FIG. 8 illustrates a result of measurement of the delay time in a state where an impact was applied three times to the surface of the object 130b by the above-described falling weight test.

In an example of FIG. 8, the exciter 101 applied ultrasonic vibrations of chirp waves including ultrasonic vibrations in a frequency range lower than 300 kHz to the object 130b. The vibration detector 102 detected ultrasonic vibrations that were applied to the object 130b by the exciter 101 and were propagated in the object 130b.

Delay time measurement was performed by obtaining a propagation time of ultrasonic vibrations that propagated in the object 130b for each frequency from an output value of the vibration detector 102 and thereafter obtaining a delay time of the propagation time relative to the reference propagation time of the object 130b in a frequency range lower than 300 kHz. FIG. 8 illustrates the delay time in accordance with the frequency.

As illustrated in FIG. 8, the delay time increases as the frequency increases. The delay time is maximum at a predetermined frequency. The internal state detector 100 can easily estimate a size of the region in which the internal state changes by performing estimation of the internal state using a maximum value of the delay time.

Next, the inventors of the present teaching checked how the propagation time of ultrasonic vibrations relative to an object changed by changing the number of times an impact was applied on the object constituted by a woven fiber-reinforced resin. In the falling weight test, the object 130b of a woven fiber-reinforced resin with the same thickness as that of the above-described woven fiber-reinforced resin, that is, 3.7 mm, was used, and the weight 135 was dropped on a surface of the object 130b to apply an impact on the surface of the object 130b. This falling weight test was performed by changing the number of times an impact was applied from one to five times. The falling weight test was performed by dropping the weight 135 on the surface of the object 130b such that an impact energy applied to the surface of the object 130b by one application of an impact was 15.9 J.

Table 1 illustrates results obtained by measuring a size of the internal state change portion 131 of the woven fiber-reinforced resin material when a falling weight impact was applied. The size of the internal state change portion 131 was obtained from an image of the internal state acquired by an ultrasonic flaw inspection. In Table 1, Xmax and Ymax are respective maximum values of a length X of the internal state change portion 131 in a horizontal direction and a length Y the internal state change portion 131 in a vertical direction illustrated in FIG. 3. In Table 1, S indicates a surface area of the internal state change portion 131 illustrated in FIG. 3.

TABLE 1

| Number of times an impact was applied | Xmax (mm) | Ymax (mm) | S (mm²) | Equivalent diameter (mm) |
|---|---|---|---|---|
| 1 | 22.17 | 13 | 226.36 | 17 |
| 2 | 23.28 | 15 | 274.26 | 18.7 |
| 3 | 25.76 | 16.5 | 333.83 | 20.6 |
| 4 | 28.26 | 18.6 | 412.83 | 22.9 |
| 5 | 31.46 | 19 | 469.46 | 24.4 |

It is understood from Table 1 that the internal state change portion 131 increases as the number of times an impact is applied on the surface of the object 130b increases.

Figure 9A:
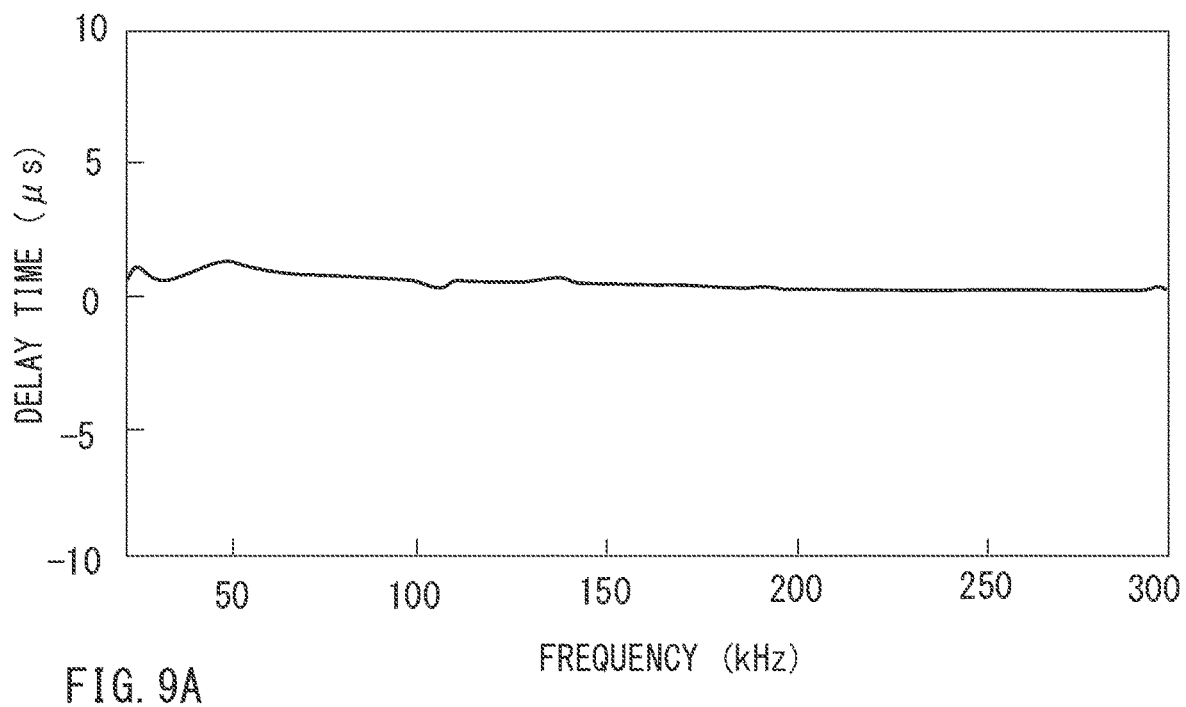
FIG. 9A is a characteristic diagram illustrating a relationship between the delay time of the propagation time and the frequency in a case where a falling weight impact was applied once to the woven fiber-reinforced resin material that is an object.
Figure 9B:
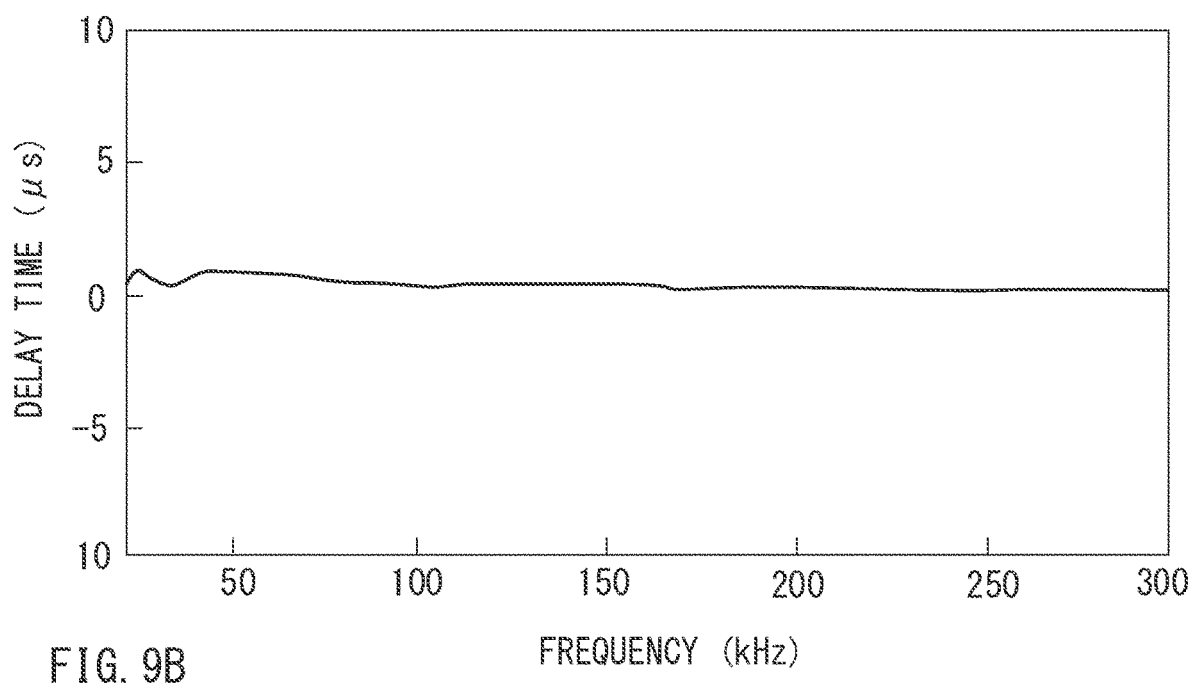
FIG. 9B is a characteristic diagram illustrating a relationship between the delay time of the propagation time and the frequency in a case where a falling weight impact was applied twice to the woven fiber-reinforced resin material that is the object.
Figure 9C:
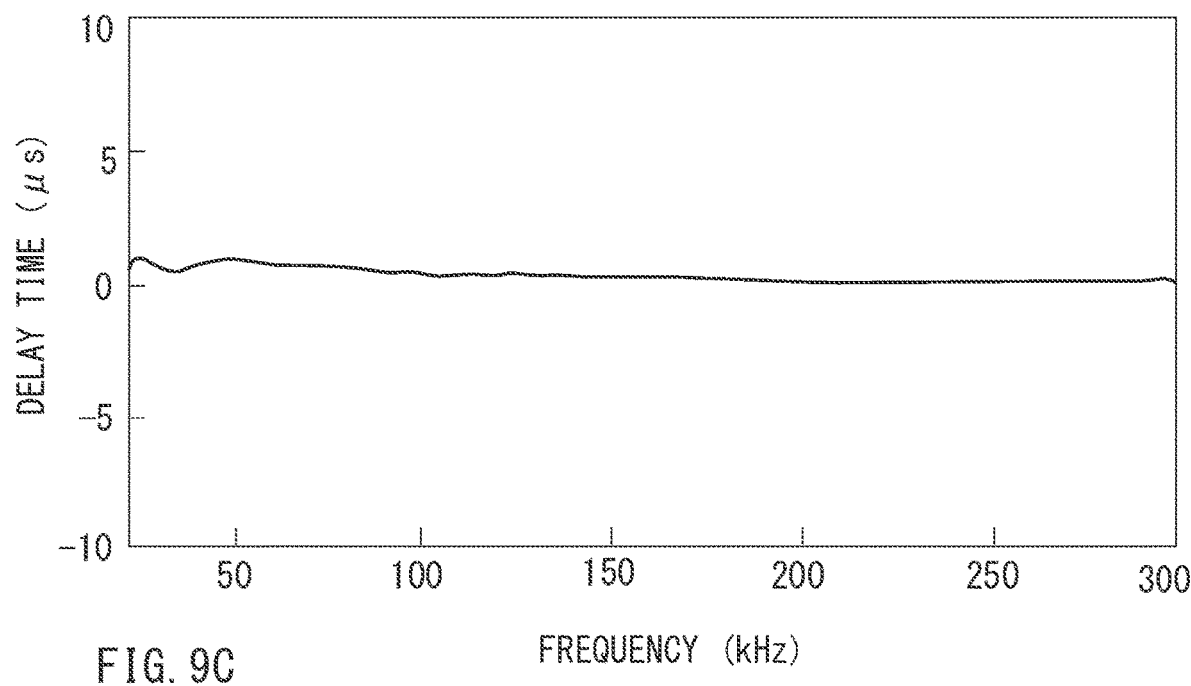
FIG. 9C is a characteristic diagram illustrating a relationship between the delay time of the propagation time and the frequency in a case where a falling weight impact was applied three times to the woven fiber-reinforced resin material that is the object.
Figure 9D:
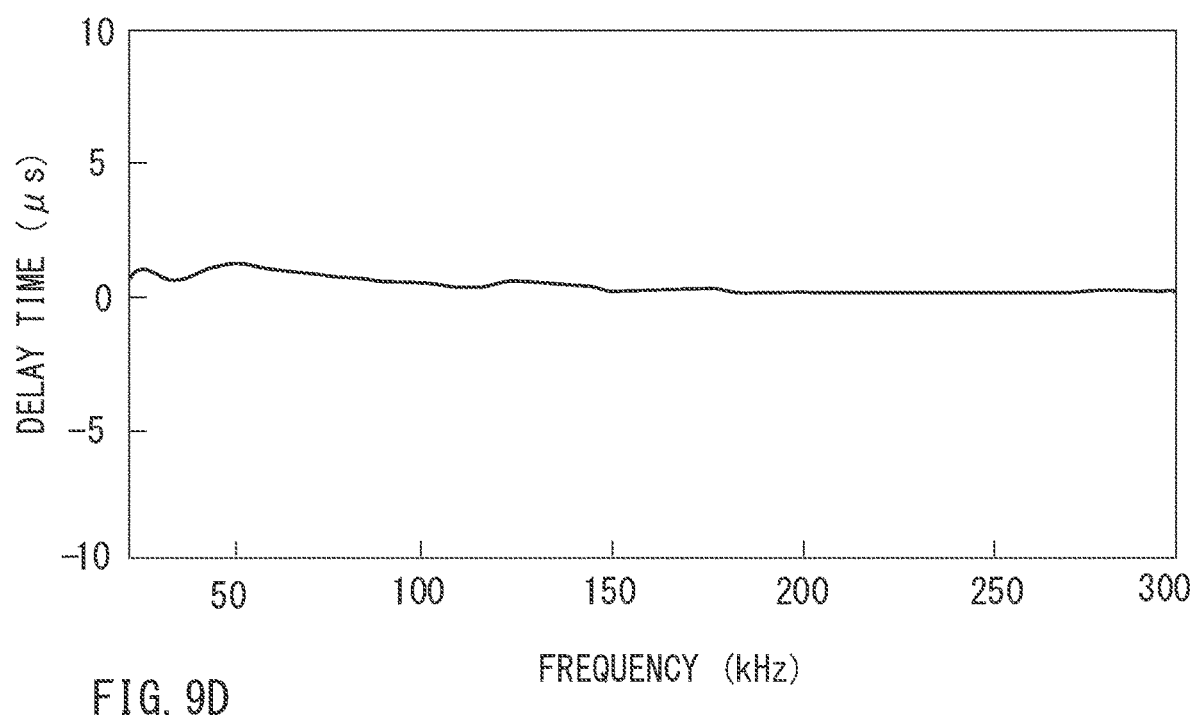
FIG. 9D is a characteristic diagram illustrating a relationship between the delay time of the propagation time and the frequency in a case where a falling weight impact was applied four times to the woven fiber-reinforced resin material that is the object.
Figure 9E:
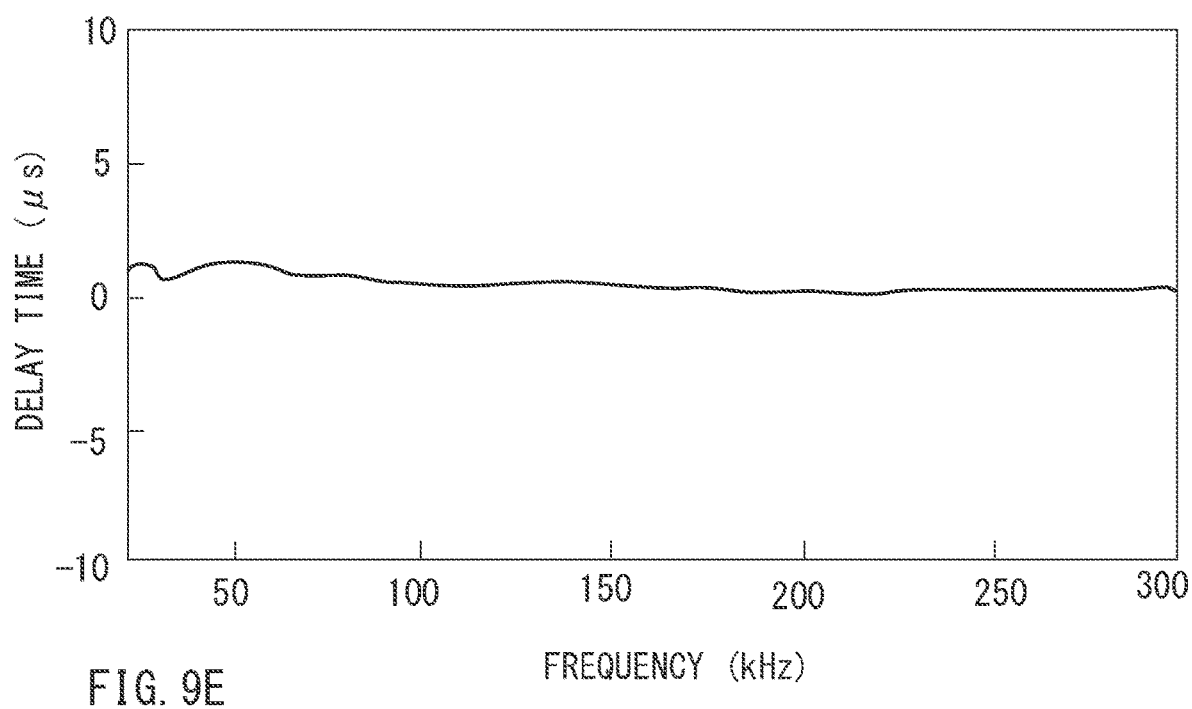
FIG. 9E is a characteristic diagram illustrating a relationship between the delay time of the propagation time and the frequency in a case where a falling weight impact was applied five times to the woven fiber-reinforced resin material that is the object.

FIG. 9A to FIG. 9E illustrate results of calculation of the delay time after the impact test was performed. FIG. 9A to FIG. 9E are characteristic diagrams each illustrating a relationship between a delay time occurring between a propagation time calculated using a woven fiber-reinforced resin material to which a falling weight impact was applied as an object and a reference propagation time in a case where a healthy woven fiber-reinforced resin material serving as a reference was used as the object and the frequency. FIG. 9A is a characteristic diagram in a case where the number of times an impact was applied to the surface of the object 130b was once. FIG. 9B is a characteristic diagram in a case where the number of times an impact was applied to the surface of the object 130b was twice. FIG. 9C is a characteristic diagram in a case where the number of times an impact was applied to the surface of the object 130b was three times. FIG. 9D is a characteristic diagram in a case where the number of times an impact was applied to the surface of the object 130b was four times. FIG. 9E is a characteristic diagram in a case where the number of times an impact was applied to the surface of the object 130b was five times.

FIG. 9A to FIG. 9E each illustrate a relationship between the frequency in a range from 0 to 300 kHz and a delay time of a propagation time of ultrasonic vibrations. As illustrated in FIG. 9A to FIG. 9E, when an impact was applied on the surface of the object 130b, the propagation time was delayed. In a case where fiber fracture, a shear crack, delamination, or the like occurred in the object 130b, the propagation time was delayed. It is understood that, in a case where the propagation time was delayed, the internal state of the object 130b changed. It is understood that the delay time of the propagation time of the ultrasonic vibrations has a peak depending on the frequency.

Table 2 illustrates results of measurement of the delay time of the propagation time of the ultrasonic vibrations at the frequency at which a peak occurs.

TABLE 2

| | Number of times an impact was applied | | | | |
|---|---|---|---|---|---|
| | 1 | 2 | 3 | 4 | 5 |
| Delay time (µs) | 0.9 | 1 | 1.1 | 1.3 | 1.4 |
| Frequency (kHz) | 43 to 56 | 44 to 55 | 49 to 50 | 45 to 53 | 45 to 53 |

As illustrated in Table 2, it is understood that the delay time increases as the number of times an impact is applied increases. As the number of times an impact is applied increases, the region in which a state change occurs in the object 130b increases. Therefore, it is understood from Table 2 that the delay time of the propagation time of the ultrasonic vibrations changes depending on a size of the region in which the internal state of the object 130b changes. Thus, the size of the region in which the internal state of the object 130b changes can be estimated based on the delay time of the propagation time of the ultrasonic vibrations.

(Other Embodiments)

The embodiment of the present teaching has been described above, but the above-described embodiments are merely examples for carrying out the present teaching. Therefore, the present teaching is not limited to the above-described embodiment and the above-described embodiment can be appropriately modified and implemented without departing from the gist of the present teaching.

In this embodiment, as illustrated in FIG. 3, the case where the exciter 101 and the vibration detector 102 are mounted on the object 130 has been described. The present teaching is not limited thereto and a plurality of vibration detectors 102a, 102b, and 102c may be mounted on the object 130.

FIG. 4 is a plan view schematically illustrating a state where one exciter 101a and a plurality (three in this embodiment) of vibration detectors 102a, 102b, and 102c are mounted on the object 130. As the exciter 101a, an actuator constituted by a film-shaped MFC with a length of 85 mm is used. As each of the vibration detectors 102a, 102b, and 102c, a sensor constituted by a film-shaped MFC with a thickness of 7 mm is used. Each of the vibration detectors 102a, 102b, and 102c is arranged on the object 130 so as to correspond to an associated one of a center portion of the exciter 101a in a longitudinal direction of the exciter 101a and both end portions of the exciter 101a in the longitudinal direction.

The internal state estimation calculator 110 calculates a propagation time from output values of the plurality of vibration detectors 102a, 102b, and 102c for each frequency, estimates the internal state of the object 130, based on a delay of the propagation time in each mode in the frequency range where only the S0 mode and the A0 mode appear, and outputs the estimated internal state.

According to this embodiment, in a falling weight test, the weight 135 was dropped on the surface of the object 130 of a woven fiber-reinforced resin with a thickness of 3.7 mm to apply an impact to the surface of the object 130. The delay time of the propagation time was calculated, based on a result of detection performed by the vibration detectors 102a, 102b, and 102c.

The falling weight test was performed by dropping the weight 135 on the surface of the object 130 such that an impact energy applied to the surface of the object 130 was 15.9 J. The delay time of the propagation time was calculated using propagation times detected by the three vibration detectors 102a, 102b, and 102c.

The number of times an impact was applied on the object 130 was once. As a result of measurement of a propagation time of ultrasonic vibrations in a frequency range from 47 to 50 kHz, the delay time detected by the vibration detector 102a was 1.9 µs, the delay time detected by the vibration detector 102b was 1.6 µs, and the delay time detected by the vibration detector 102c was 1.9 µs.

As descried above, in a case where one exciter 101a and a plurality of vibration detectors 102a, 102b, and 102c are arranged on the object 130, when a state change occurs in the object 130, the delay time of the propagation time is detected by each of the vibration detectors 102a, 102b, and 102b. Thus, the internal state detector 100 of this embodiment can estimate a change of the internal state in a wide range of the object 130.

In the above-described embodiment, a case where one exciter 101a and three vibration detectors 102a, 102b, and 102c are mounted on the object 130 has been described above. However, a plurality of exciters may be mounted on an object. The number of vibration detectors mounted on an object is not limited to three. The numbers of exciters and vibration detectors mounted on the object may be determined in accordance with a size of the object as appropriate.

In the above-described embodiment, the object 130 is a woven fiber-reinforced resin reinforced by a carbon fiber. The woven fiber-reinforced resin reinforced by a carbon fiber is preferably, for example, a thermosetting resin, such as an epoxy resin, vinyl ester, a phenol resin, polyurethane, or the like. Note that the fiber may be a glass fiber as well as a carbon fiber. As the resin, a thermoplastic resin, such as polypropylene, polycarbonate, polyethylene, polyamide, or the like, may be used.

Furthermore, the present teaching can be applied to some other fiber-reinforced resin, such as a UD material including a carbon fiber-reinforced resin, or the like, than a woven fiber-reinforced resin. That is, the resin may be a resin of some other type, as long as the resin can be reinforce by a fiber.

Figure 10:
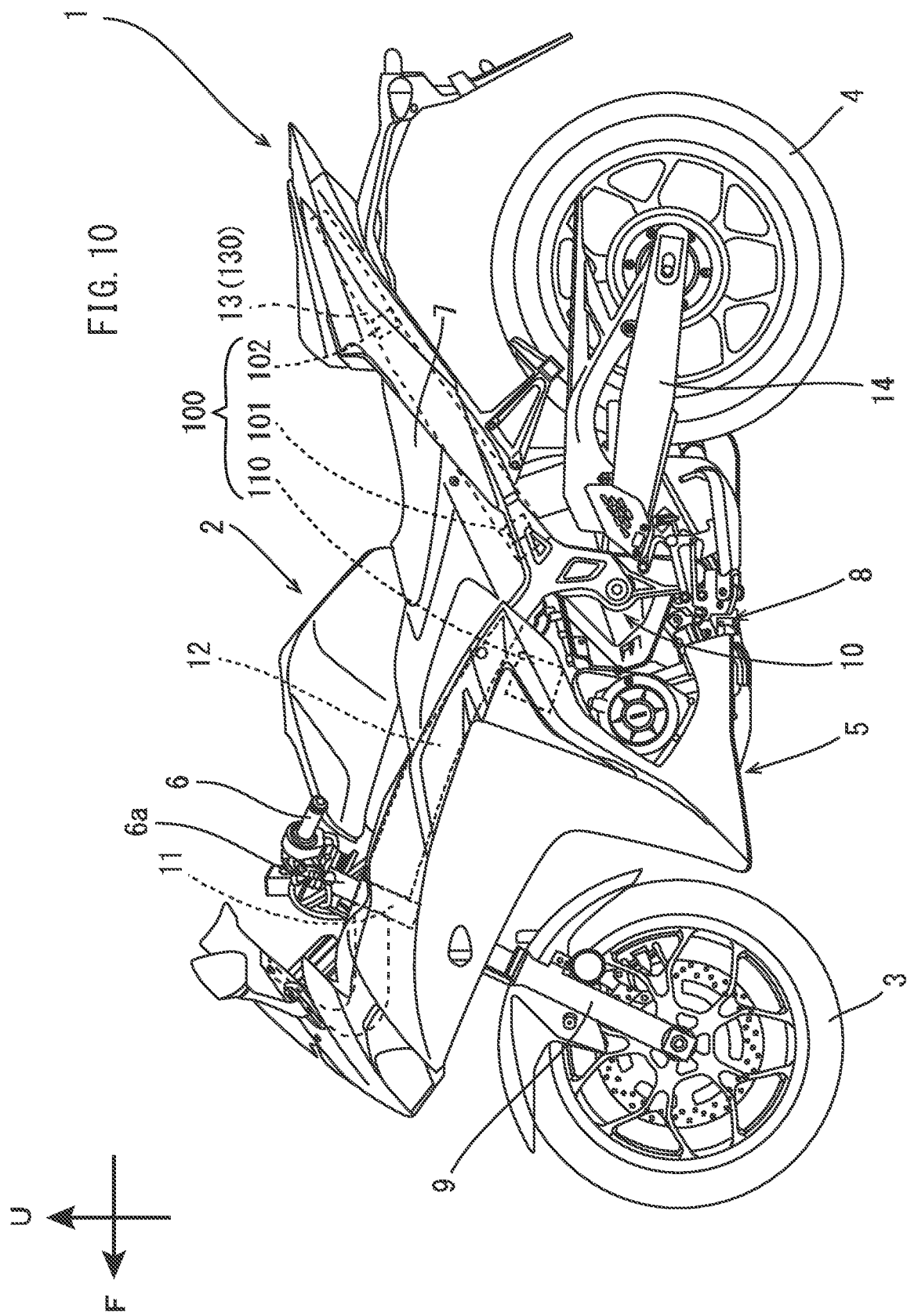
FIG. 10 is a side view of an entire configuration of a vehicle according to an embodiment of the present teaching.
Figure 11:
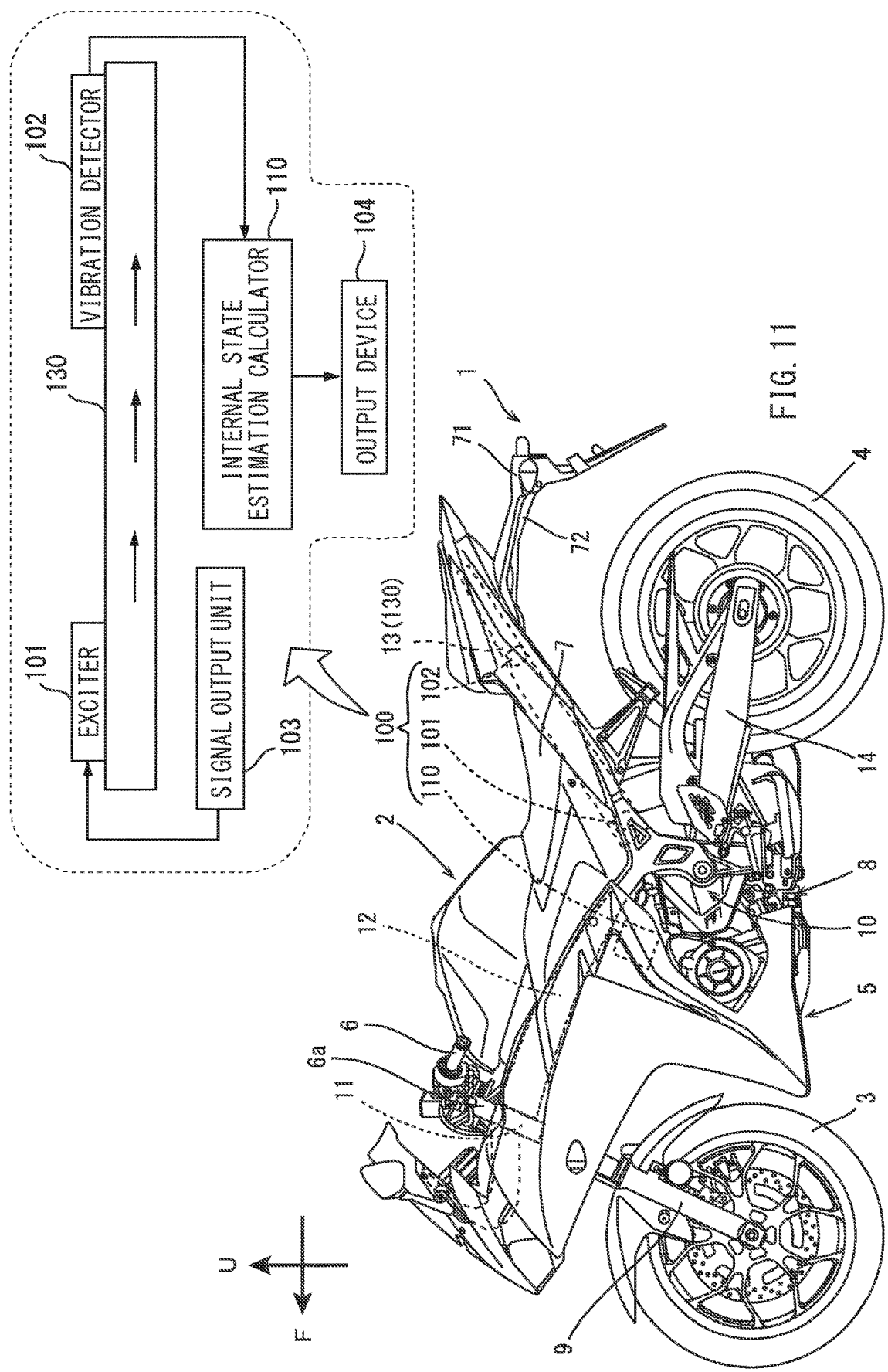
FIG. 11 is a view illustrating an entire configuration of a vehicle and a configuration of an internal state detector.

The internal state detector 100 of this embodiment can be provided in a vehicle. FIG. 10 illustrates an entire configuration of a vehicle 1 as a vehicle on which the internal state detector 100 of this embodiment is provided. FIG. 11 illustrates the entire configuration of the vehicle 1 and a configuration of the internal state detector 100.

In the following description, arrow F in the drawings represents a forward direction of the vehicle 1. Arrow U in the drawings represents an upward direction of the vehicle 1. Note that a front and rear direction and a left and right direction mean a front and rear direction and a left and right direction when viewed from an occupant who drives the vehicle 1, respectively.

FIG. 10 is a side view illustrating an outline of the entire configuration of the vehicle 1 as a vehicle according to the embodiment. The vehicle 1 is, for example, a motorcycle and includes a vehicle body 2, a front wheel 3, and a rear wheel 4. In this embodiment, the vehicle 1 is a straddled vehicle on which the occupant rides in a state in which the occupant straddles the vehicle 1. As used herein, the term "straddled vehicle" refers to a vehicle including a saddle-type seat. The straddled vehicle includes, for example, motorcycles, three-wheeled vehicles, four-wheeled vehicles, or the like.

The vehicle body 2 supports each of components, such as the front wheel 3, the rear wheel 4, a vehicle body cover 5, a handlebar 6, a seat 7, a power unit 8, or the like. In this embodiment, the vehicle body 2 is a structure including a frame 10 and a rear arm 14 and supporting each of components of the vehicle 1.

The rear arm 14 supports the rear wheel 4 with respect to the frame 10. A front portion of the rear arm 14 is connected to a main frame 12 of the frame 10 rotatably in an up-down direction.

Note that the front wheel 3 is rotatably supported by a pair of front forks 9 supported by the vehicle body 2.

The frame 10 includes a head pipe 11, the main frame 12, and a rear frame 13.

As illustrated in FIG. 10, the head pipe 11 is located in a front portion of the vehicle 1 and rotatably supports a steering shaft 6a connected to the handlebar 6. The head pipe 11 is connected to a front portion of the main frame 12.

The main frame 12 is connected to the head pipe 11 so as to extend from the head pipe 11 toward rear of the vehicle. The power unit 8 or the like is supported by the main frame 12. Note that at least a portion of the frame 10 is covered with the vehicle body cover 5.

In this embodiment, the main frame 12 may be constituted by a metal material and may be constituted by a fiber-reinforced resin material obtained by reinforcing a resin with a fiber, such as a carbon fiber or the like. A portion of the main frame 12 may be constituted by the fiber-reinforced resin material.

The rear frame 13 is connected to a rear portion of the main frame 12. In this embodiment, the rear frame 13 may be constituted by a metal material, and may be constituted by a fiber-reinforced resin material obtained by reinforcing a resin with a fiber, such as a carbon fiber or the like. A portion of the rear frame 13 may be constituted by the fiber-reinforced resin material.

The handlebar 6 is mounted on an upper portion of the pair of front forks 9 rotatably supporting the front wheel 3.

Note that components constituting the vehicle body 2 may be constituted by a carbon fiber-reinforced resin material obtained by reinforcing a resin with a carbon fiber. For example, in addition to the main frame 12 and the rear frame 13, the rear arm 14 or the like may be constituted by a carbon fiber-reinforced resin material obtained by reinforcing a resin with a carbon fiber.

In this embodiment, the rear frame 13 is constituted by a carbon fiber-reinforced resin material obtained by reinforcing a resin with a carbon fiber. A resin of the carbon fiber-reinforced resin material is preferably, for example, a thermosetting resin, such as an epoxy resin, vinyl ester, a phenol resin, polyurethane, or the like. In this embodiment, the carbon fiber is, for example, a woven fiber in which fibers are woven. That is, in this embodiment, the fiber-reinforced resin material is a woven fiber-reinforced resin material. Note that the fiber may be a glass fiber as well as a carbon fiber. As the resin, a thermoplastic resin, such as polypropylene, polycarbonate, polyethylene, polyamide, or the like, may be used. The resin may be a resin of some other type, as long as the resin can be reinforced by a fiber.

As described above, when the rear frame 13 constituted by the carbon fiber-reinforced resin material receives an impact, an internal state of the rear frame 13 changes. The change of the internal state of the rear frame 13 is detected by the internal state detector 100. As illustrated in FIG. 11, in this embodiment, the exciter 101 and the vibration detector 102 of the internal state detector 100 are mounted on a plate-shaped portion of the rear frame 13. The internal state detector 100 performs detection on the plate-shaped portion of the rear frame 13 as the object 130. The internal state estimation calculator 110 estimates an internal state of a portion between the exciter 101 and the vibration detector 102. The internal state estimation calculator 110 outputs a result of the estimation to the output device 104.

When the internal state estimation calculator 110 estimates that there is a region in which a state has changed in the object 130, the output device 104 notifies a user, such as a driver or the like, of a result of the estimation. The output device 104 can be constituted, for example, by a lamp provided in a meter. The internal state detector 100 can report the user of the internal state of the object 130 by lighting the lamp.

The present teaching can be applied without limiting a thickness and a shape of an object. For example, although, in the above-described embodiment, the present teaching is applied to the rear frame 13, the present teaching can be applied to some other component of the vehicle, such as the main frame 12, the rear arm 14, or the like, than the rear frame 13, which is constituted by a fiber-reinforced resin material. A thickness and a shape vary depending on the component, and therefore, the internal state detector 100 of the present teaching may be configured to estimate an internal state of the component in accordance with the thickness and the shape of the component.

In the above-described embodiment, as an example of the vehicle 1, a motorcycle has been descried, but the vehicle 1 may be a vehicle having any configuration, such as a three-wheeled vehicle, a four-wheeled vehicle or the like, as long as the vehicle is a vehicle on which an occupant rides.

Furthermore, a configuration according to the present teaching can be applied to a vehicle using a resin material that can be reinforced by a fiber, such as a vessel, such as a pleasure boat or the like, an aircraft, or the like, as well as the above-described vehicle.

Furthermore, the present teaching can be applied to a component using a resin material that can be reinforced with a fiber or a device using the component, as well as the above-described vehicle.

REFERENCE SIGNS LIST

1 Vehicle
100 Internal state detector
101 Exciter
102 Vibration detector
103 Signal output unit
104 Output device
110 Internal state estimation calculator
111 Propagation time detector 112 Propagation time memory
113 Reference propagation time memory
114 Internal state determinator
130 Object

The invention claimed is:

1. An internal state detector that detects an internal state of an object, the object being of a plate shape and including a fiber-reinforced resin, the internal state detector comprising:
    an exciter that applies, to a surface of the object, ultrasonic vibrations of Lamb waves, including the ultrasonic vibrations in a selected frequency range where only a zero-order fundamental wave symmetric mode and a zero-order fundamental wave asymmetric mode of the Lamb waves appear, the selected frequency range including a plurality of frequencies;
    a vibration detector that detects the ultrasonic vibrations of the Lamb waves applied by the exciter to the object and propagating in the object; and
    an internal state estimation calculator that estimates the internal state of the object, based on a detection result of the vibration detector, the internal state estimation calculator being configured to
        obtain a propagation time of the ultrasonic vibrations propagating in the object corresponding to each frequency of the Lamb waves, based on the detection result of the vibration detector obtained responsive to the vibration application by the exciter,
        estimate the internal state of the object, based on a delay time of the propagation time relative to a reference propagation time of the object for each of the plurality of frequencies in the selected frequency range, and
        output the estimated internal state, wherein
    the internal state estimation calculator is configured to estimate the internal state of the object, based on a maximum time difference in delay time of the propagation time for the plurality of frequencies in the selected frequency range.

2. The internal state detector according to claim 1, wherein
    the vibration detector includes a plurality of vibration detectors, and
    the internal state estimation calculator obtains the propagation time of the ultrasonic vibrations propagating in the object from an output value of each of the plurality of vibration detectors.

3. The internal state detector according to claim 1, further comprising:
    a memory that stores reference propagation times of the object corresponding to a plurality of frequencies in the selected frequency range, wherein
    the internal state estimation calculator estimates the internal state of the object, based on one of the stored reference propagation times of the object corresponding to each of at least one frequency in the frequency range and based on the propagation time corresponding to a frequency equal to said each frequency.

4. The internal state detector according to claim 1, wherein
    the ultrasonic vibrations applied by the exciter to the object have a frequency that increases or decreases with time.

5. The internal state detector according to claim 1, wherein
    each of the exciter and the vibration detector is a film-shaped piezoelectric element.

6. The internal state detector according to claim 1, wherein
    the object is formed of a woven fiber-reinforced resin material.

7. A vehicle using a plate member including a fiber-reinforced resin, the vehicle comprising:
    the internal state detector according to claim 1, wherein
    the internal state detector is configured to detect an internal state of the plate member.

* * * * *